United States Patent [19]

Saito et al.

[11] Patent Number: 4,497,977

[45] Date of Patent: Feb. 5, 1985

[54] AUTOMATIC COORDINATE DETERMINING DEVICE HAVING ELECTROSTATIC SHIELDING

[75] Inventors: Yasuhiro Saito; Takaomi Tatemichi, both of Tokyo, Japan

[73] Assignee: Kabushiki Kaisha Daini Seikosha, Tokyo, Japan

[21] Appl. No.: 471,821

[22] Filed: Mar. 3, 1983

[51] Int. Cl.³ ............................................. G08C 21/00
[52] U.S. Cl. ..................................................... 178/19
[58] Field of Search ...................... 178/18, 19; 33/1 M Primary Examiner—Stafford D. Schreyer Attorney, Agent, or Firm—Robert E. Burns; Emmanuel J. Lobato; Bruce L. Adams

[57] ABSTRACT

An automatic coordinate determining device has a coordinate tablet comprised of a plurality of conductive lines, and a hand-held probe positionable relative to the tablet for inducing a signal in the conductive lines. A thin film of non-magnetic conductive material, such as aluminum or copper, is provided above the upper surface of the conductive lines for eliminating electrostatic induction caused by floating capacitance attributable to the hand which holds the probe.

4 Claims, 7 Drawing Figures

AUTOMATIC COORDINATE DETERMINING DEVICE HAVING ELECTROSTATIC SHIELDING

BACKGROUND OF THE INVENTION

This invention relates generally to an automatic coordinate determining device, and more particularly to an automatic coordinate determining device whose upper surface of a coordinate tablet is electrostatically shielded. A conventional automatic coordinate determining device is constructed as shown in FIG. 1. Numeral 1 is a coordinate tablet formed with an insulating plate 2 having conductive lines Xn, Ym. Numerals 3X, 3Y represent scanning means for scanning respective conductive lines Xn, Ym. Numeral 4 is a pencil shaped probe having an excitation winding 5 for generating the inductive signal against the conductive lines Xn, Ym. Numeral 6 is a crystal oscillator which coacts with an amplifier 7 to form an oscillatory signal generator to magnetize the winding 5, and the alternating inductive frequency of the oscillatory signal generator is about 300 KHz. Numeral 8 is a pen switch for supplying a signal to an operation control means 11 when operates at more than a predetermined pressure. Numeral 9 is an amplifying filter means for processing the wave form of the induced signal 1 from the conductive lines Xn, Ym. Numeral 10 is an AD converter for converting the output of the amplifying filter means 9. A scanning detecting means is made up of conductive lines 3X, 3Y, the amplifying filter means 9, and the AD converter 10. The operation control means 11 includes a data memory and CPU (not shown) for operating the coordinate of the probe 4 with the output of the AD converter 10, and controls all the external input and output signals. Numeral 12 is an external device which has output and input terminals connected to the operation control means 11. Numeral 13 is a scanning address register which is controlled by the operation control means 11.

In the case of actually using the coordinate determining device as shown in FIG. 1, a hand H which holds the probe 4 must be set above the plate 2 having the conductive lines Xn (Ym), i.e. on the cover member 2a (made of an insulating material) as shown in FIG. 2. In this case, floating capacitances Cs1 and Cs2 are formed respectively between the winding 5 and the hand H, and between the hand H and the conductive lines Xn (Ym). Therefore the electric potential of the capacitance Cs1 is vibrated by the electromagnetic wave generated by the alternating magnetic field from the winding 5. This electrical vibration is coupled with the conductive lines Xn (Ym) electrostatically via the hand H and the capacitance Cs2. Accordingly, the conductive lines Xn (Ym) generate both the electromagnetic induced signal by the winding 5 and the electrostatic induced signal by the hand H.

The scanning signal wave form in the above case is shown in FIG. 3, and the original scanning signal waveform by the electromagnetic induction is levelled up in proportion to the electrostatic induced voltage Vo. Generally, the maximum signal voltage Vp is about 6 V, while the electrostatic induced voltage Vo can reach to the extent of 2 V. Therefore, the voltage of the secondary peak P1 or P2 which is not detected in the normal state can exceed the threshold voltage Vth. Then the operation control means 11 may misjudge the secondary peak P1 as the maximum signal when the scanning is excuted from the left side in FIG. 3, and operates a mistaken coordinate of the probe 4.

SUMMARY OF THE INVENTION

This invention aims to eliminate the above-noted drawbacks and therefore it is an object of this invention to provide an automatic coordinate determining device which prevents the influence of the electrostatic induction via a hand by a floating capacitance, by forming a thin film member made of non-magnetic conductive substance above the conductive lines, i.e. above the upper surface of the coordinate tablet.

Hereinafter the present invention will be described in conjunction with the drawings.

Figure 1:
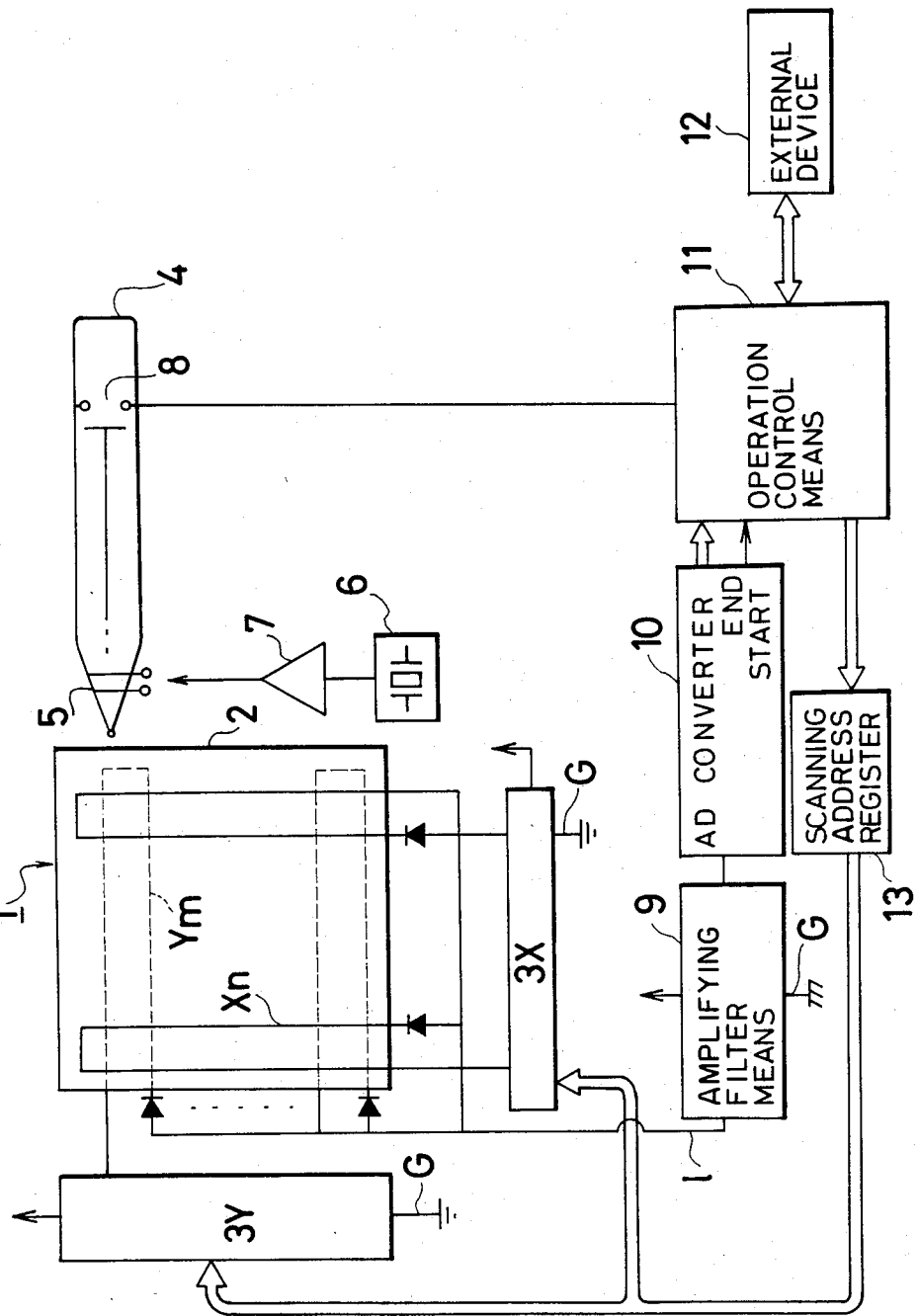
FIG. 1 is a schematic block diagram showing a conventional automatic coordinate determining device.
Figure 2:
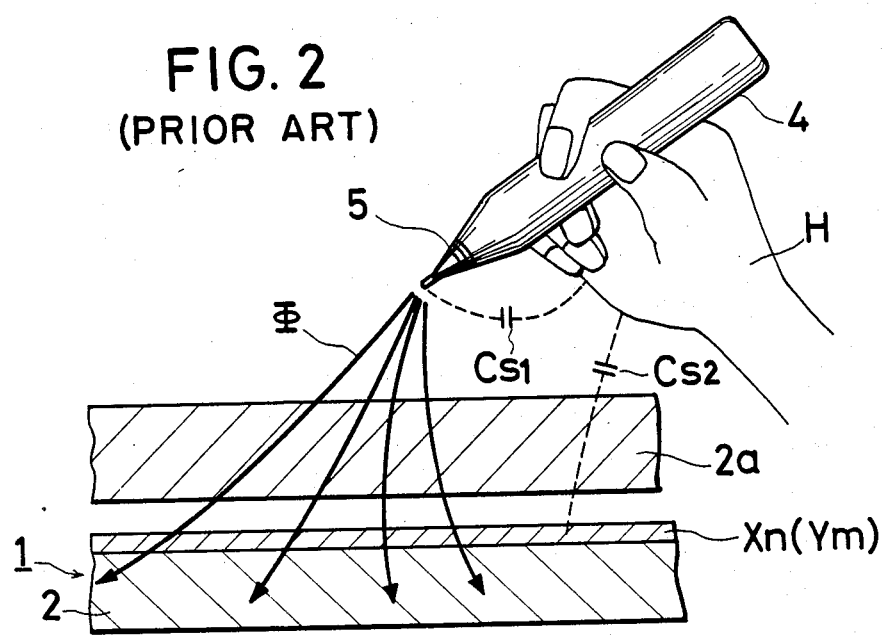
FIG. 2 is an explanatory view of the essential part of the conventional device in use.
Figure 3:
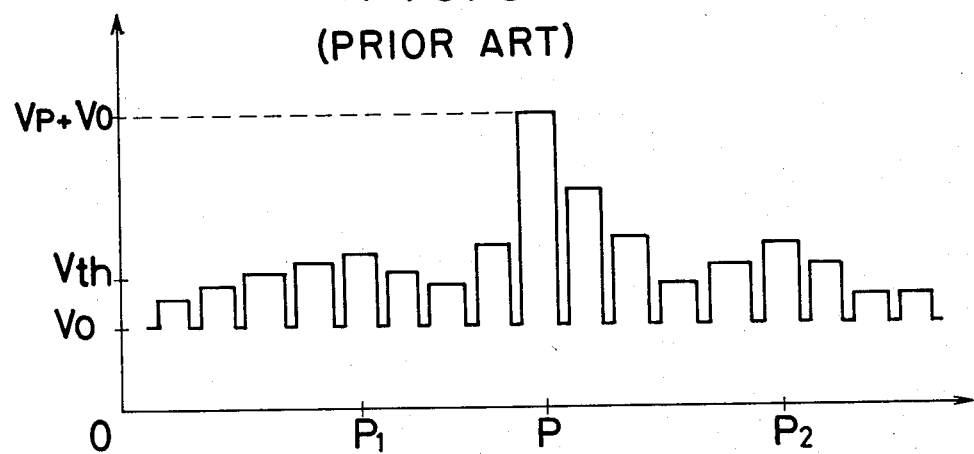
FIG. 3 is a waveform chart of the conventional device in FIG. 2.
Figure 4A:
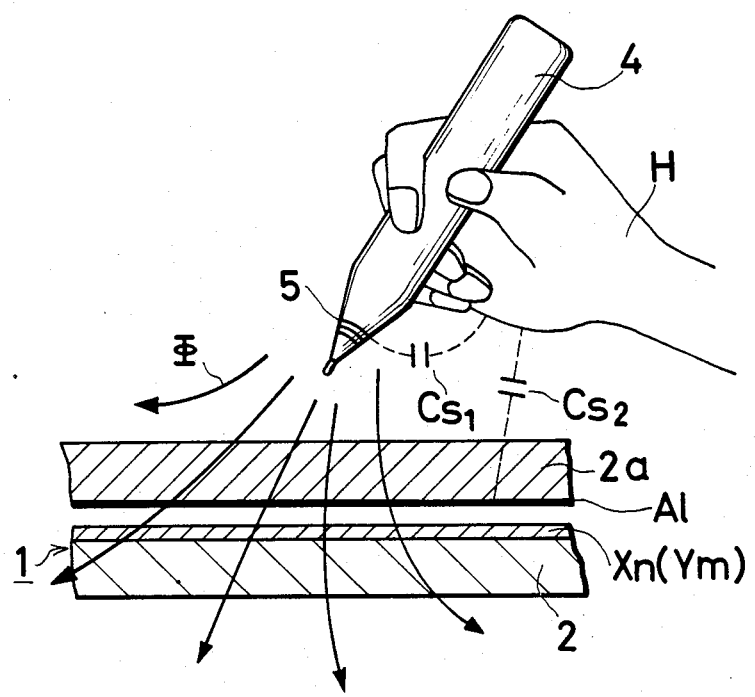
FIG. 4a is an explanatory view of the essential part of this invention in use.
Figure 4B:
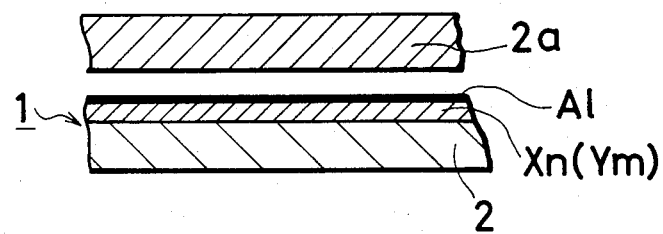
FIG. 4b is a cross sectional view of the essential part of another embodiment of this invention.
Figure 5:
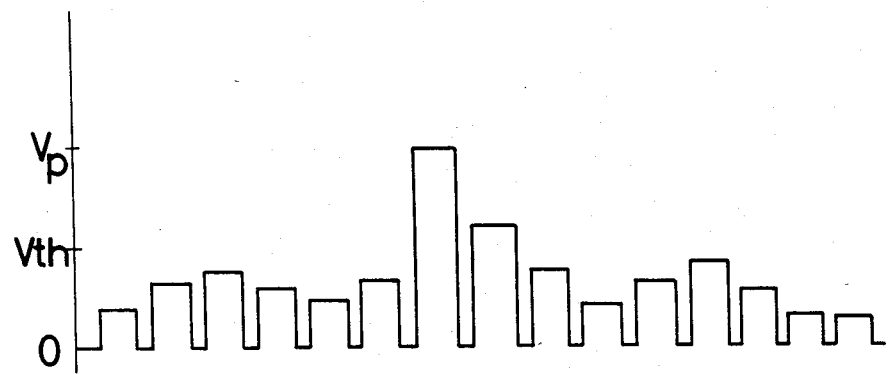
FIG. 5 is a waveform chart showing the scanning signals in FIG. 4a, and FIG. 6 is a schematic cross sectional view showing an embodiment of this invention.

FIG. 4a shows a preferred embodiment of this invention, and the numerals respectively correspond with those of FIG. 2. In this embodiment, aluminum Al is evaporated in vacuum on the inner surface of the cover member 2a which covers the upper surface of the coordinate tablet 1 consisting of an insulating plate 2 and conductive lines Xn (Ym), and the aluminum Al forms a conductive thin film member. The aluminum thin film Al is 0.05–0.5u thick and is made by one or more evaporations, and the electric resistance value can be sufficiently small (less than several $\Omega$) and small enough to shield the conductive lines Xn (Ym) electrostatically (the resistance value is not fixed because the electrostatic field is changed). When the thin film Al is connected to the ground terminal of the scanning detecting means including the scanning means 3X, 3Y, the electrostatic induced voltage from the hand H flows from the floating capacitance $C_{s2}$ via the thin film Al to the ground terminal even if the conventional floating capacitances $C_{s1}$ and $C_{s2}$ exist, because the impedance of the thin film Al is sufficiently small. Accordingly, the electromagnetic induced voltage of the conductive lines Xn (Ym) by the magnetic flux $\Phi$ is never affected. On the other hand, since the thin film Al is sufficiently thin enough to avoid the influence of eddy current which is generated by the alternating magnetic flux $\Phi$ from the winding 5, the electromagnetic induced voltage of the conductive lines Xn (Ym) can be detected without decrement. Accordingly, only the desired primary scanning signal can be detected as shown in FIG. 5. Although the embodiment in FIG. 4a shows that the thin film Al is evaporated on the inner surface of the cover member 2a, the thin film Al can be evaporated on the conductive lines Xn (Ym) via solder resist film (not shown) on the insulating plate 2 as shown in FIG. 4b since the thin film Al should only exist above the upper surface of the tablet 1, and also an insulating plate (not shown) having the thin film A1 can be inserted between the cover member 2a and the coordinate tablet 1.

Figure 6:
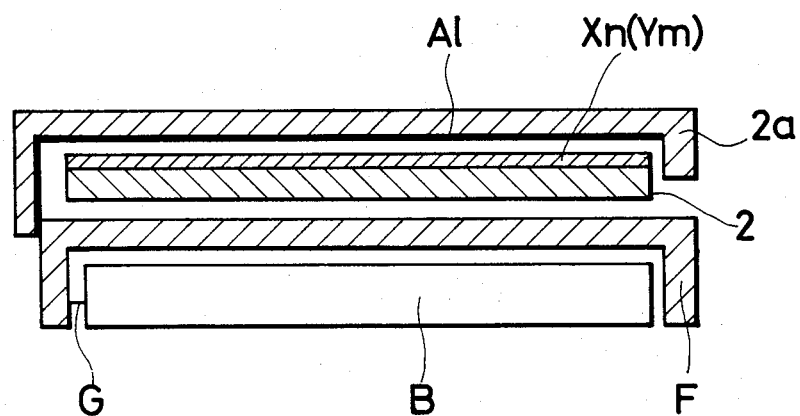

Generally, as shown in FIG. 6, a circuit block B including the scanning means 3X, 3Y is shielded by a conductive frame F, and the frame F is connected to the ground terminal G of the circuit block B. Therefore the thin film A1 can be easily connected to the ground terminal G of the scanning detecting means if connected to the frame F.

According to our experiment, when the thin film A1 of $0.05 \sim 0.2\mu$ thick is formed on the inner surface of the cover member 2a by 1-3 times vacuum evaporation, the influence of the electrostatic induced voltage Vo can be eliminated to nearly 0 V without deterioration of the electromagnetic induced voltage in comparison with the conventional device which has no thin film A1.

The above value is obviously excellent in comparison with the case of grounding the hand H (body) by which the voltage Vo reduces to nearly 0.2 V, and the case of grounding a periphery of the probe 4 by which the voltage Vo reduces to nearly 0.1 V. Actually, it is difficult to ground the hand H (body) practically, because the coordinate determining device is used usually in the office and the probe 4 must emit the alternating magnetic field.

It is found that the practically useful thickness range of the thin film A1 is $0.01 \sim 10\mu$, which satisfies the mutually contradictory conditions of a necessity of having low impedance and a necessity of eliminating the interruption on the electromagnetic induction by the eddy current.

In the above mentioned embodiment, although aluminum is used as a thin film member, it is to be noted the same effect is obtained by using another non-magnetic conductive substance (such as Cu). And the thin film member can be formed by the electrical or non-electrical plating instead of the vacuum evaporation.

According to the present invention, only the electrostatic induction can be eliminated without interrupting the electromagnetic induction by the probe against the conductive lines by the construction of forming a thin film member made of non-magnetic conductive substance above the upper surface of the coordinate tablet, and connecting the thin film member to the ground terminal of the scanning detecting means. Further the practically applicable range of thickness of $0.01 \sim 10\mu$ can be set by using Al evaporated in vacuum on the cover member on the coordinate tablet as a thin film member. Therefore the present invention is extremely advantageous.

We claim:

1. An automatic coordinate determining device, comprising: a coordinate tablet having a plurality of separate parallel spaced conductive lines, a probe positionable relative to said coordinate tablet at a coordinate position and having an inductive exciting winding for inductively coupling with said conductive lines, an oscillatory signal generator for magnetizing said inductive exciting winding, scanning detecting means for scanning said conductive lines successively and detecting the induced signal, operation control means for operating the probe coordinate in accordance with the induced signal, a thin film member composed of a non-magnetic conductive substance provided above the upper surface of said coordinate tablet, and means for connecting the electric potential of said thin film member to the ground terminal of said scanning detecting means.

2. An automatic coordinate determining device as claimed in claim 1, wherein a cover member is provided above the upper surface of said coordinate tablet, and said thin film member is composed of a non-magnetic conductive substance evaporated or plated on the inner surface of said cover member.

3. An automatic coordinate determining device as claimed in claim 2, wherein the thickness of said non-magnetic conductive member is $0.01 \sim 10\mu$.

4. An automatic coordinate determining device as claimed in claim 1, wherein said thin film member composed of a non-magnetic conductive substance is evaporated or plated on the upper surface of said coordinate tablet.

* * * * *